US012670660B2

(12) United States Patent
Sagong et al.

(10) Patent No.: US 12,670,660 B2
(45) Date of Patent: Jun. 30, 2026

(54) METHOD AND APPARATUS WITH NEURAL SCENE REPRESENTATION DATA

(71) Applicant: SAMSUNG ELECTRONICS CO., LTD., Suwon-si (KR)

(72) Inventors: Donghoon Sagong, Suwon-si (KR); Nahyup Kang, Suwon-si (KR); Jiyeon Kim, Suwon-si (KR); Hyewon Moon, Suwon-si (KR); Seokhwan Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 270 days.

(21) Appl. No.: 18/113,823

(22) Filed: Feb. 24, 2023

(65) Prior Publication Data

US 2024/0135634 A1 Apr. 25, 2024

(30) Foreign Application Priority Data

Oct. 7, 2022 (KR) ........................ 10-2022-0129056

(51) Int. Cl.
*G06T 15/20* (2011.01)
*G06T 7/73* (2017.01)
*G06T 15/06* (2011.01)

(52) U.S. Cl.
CPC .............. *G06T 15/205* (2013.01); *G06T 7/73* (2017.01); *G06T 15/06* (2013.01)

(58) Field of Classification Search
None
See application file for complete search history.

(56) References Cited

U.S. PATENT DOCUMENTS

| | | | |
|---|---|---|---|
| 11,308,659 B2 | 4/2022 | Duckworth et al. | |
| 2010/0085360 A1* | 4/2010 | Ren | G06T 15/50 |
| | | | 345/426 |
| 2010/0134494 A1 | 6/2010 | Lim et al. | |
| 2022/0301257 A1* | 9/2022 | Garbin | G06N 3/045 |
| 2024/0070762 A1* | 2/2024 | Wang | G06V 10/82 |

FOREIGN PATENT DOCUMENTS

| | | | | |
|---|---|---|---|---|
| EP | 3 979 184 A1 | 4/2022 | | |
| EP | 4191539 A1 * | 6/2023 | ............ | G06T 17/20 |
| WO | WO 2021/178000 A1 | 9/2021 | | |

OTHER PUBLICATIONS

Chen, Anpei, et al. "Tensorf: Tensorial radiance fields." *Computer Vision-ECCV 2022: 17th European Conference*, Tel Aviv, Israel, Oct. 23-27, 2022, *Proceedings, Part XXXII*. Cham: Springer Nature Switzerland, (2022). pp 1-33.

(Continued)

*Primary Examiner* — Peter Hoang
(74) *Attorney, Agent, or Firm* — MORGAN, LEWIS & BOCKIUS LLP

(57) ABSTRACT

A device including a processor configured to generate, for each of plural query inputs, point information using factors individually extracted from a plurality of pieces of factor data for a corresponding query input and generate pixel information of a pixel position using the point information of points, the plural query inputs being of the points, in a 3D space, on a view direction from a viewpoint toward a pixel position of a two-dimensional (2D) scene.

21 Claims, 8 Drawing Sheets

(56) References Cited

OTHER PUBLICATIONS

Mildenhall, Ben, et al. "Nerf: Representing scenes as neural radiance fields for view synthesis." *Communications of the ACM* vol. 65. Issue 1 (2021). pp 99-106.

Garbin, Stephan J., et al. "Fastnerf: High-fidelity neural rendering at 200fps." *Proceedings of the IEEE/CVF International Conference on Computer Vision*. (2021). pp 14346-14355.

Tewari, Ayush, et al. "Advances in neural rendering." *Computer Graphics Forum*. vol. 41. No. 2. (2022). pp 1-33.

Eslami, Sm Ali, et al., "Neural Scene Representation and Rendering", Science, vol. 360, Jun. 15, 2018, (8 Pages in English).

Extended European Search Report Issued on Mar. 27, 2024, in Counterpart European Patent Application No. 23185989.3 (8 Pages in English).

* cited by examiner

METHOD AND APPARATUS WITH NEURAL SCENE REPRESENTATION DATA

CROSS-REFERENCE TO RELATED APPLICATIONS

This application claims the benefit under 35 USC § 119(a) of Korean Patent Application No. 10-2022-0129056, filed on Oct. 7, 2022, in the Korean Intellectual Property Office, the entire disclosure of which is incorporated herein by reference for all purposes.

BACKGROUND

1. Field

The disclosure relates to a method and apparatus with neural scene representation data consideration.

2. Description of Related Art

In the field of computer graphics, typical approaches for mimicking an imaging model of a real camera, including complex materials and global illumination processing, simulate light propagation from a light source to a virtual camera for synthesis based on the law of physics. Typically, all physical parameters of a scene need to be determined in a rendering process. For example, these parameters include information about scene geometry and material properties such as reflectivity or opacity. As such, typical ray tracing techniques may generate photorealistic images using this information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided an electronic device including a processor configured to generate, for each of plural query inputs, point information using factors individually extracted from a plurality of pieces of factor data for a corresponding query input and generate pixel information of a pixel position using the point information of points, and the plural query inputs are of the points, in a 3D space, on a view direction from a viewpoint toward a pixel position of a two-dimensional (2D) scene.

The processor may be configured to determine coordinates for the query plural inputs, each of the coordinates representing a corresponding point in the 3D space and direction information representing the view direction.

For the generation of the point information, the processor may be configured to calculate the point information using a vector outer product of the factors individually extracted from the plurality of pieces of factor data.

For the generation of the point information, the processor may be configured to calculate, for each query input, color information of a point corresponding to a corresponding query input based on a first plurality of pieces of factor data, of the plurality of pieces of factor data, related to color and calculate, for each query input, volume density information of a point corresponding to a corresponding query input based on a second plurality of pieces of factor data, of the plurality of pieces of factor data, related to volume density.

For the generation of the point information, the processor may be configured to determine surrounding query inputs corresponding to voxels in a vicinity of a requested voxel among voxels in the 3D space based on an absence of the requested voxel in a piece of the factor data of the plurality of pieces of factor data and calculate point information corresponding to the requested voxel using pieces of surrounding point information obtained based on the surrounding query inputs.

For the generation of the pixel information, the processor may be configured to determine a color value of the pixel position to be the pixel information of the pixel position using the point information of the points, and the processor may be further configured to generate an image corresponding to the 2D scene by repeating the determining of the color value for pixel positions included in the 2D scene.

For the generation of the pixel information, the processor may be configured to obtain color and volume density curves of points according to the view direction and determine the pixel information based on the obtained color and volume density curves.

For the generation of the pixel information, the processor may be configured to use the plurality of pieces of factor data according to a resolution of a plurality of resolutions.

For the generation of the point information, the processor may be configured to calculate first point information of first voxels corresponding to a grid with a first resolution among points on the view direction in the 3D space, using a plurality of pieces of factor data based on the first resolution and calculate second point information of second voxels with a second resolution, higher than the first resolution, in a vicinity of the first voxels, using a plurality of pieces of factor data based on the second resolution, and, for the generating of the pixel information, the processor may be configured to determine the pixel information based on the first point information and the second point information.

The processor may be configured to generate a target space tensor representing the 3D space, factorize the target space tensor into a plurality of tensor sets, and build the plurality of tensor sets as the plurality of pieces of factor data.

For the generating of the target space tensor, the processor may be configured to compress the 3D space by extracting a portion of voxels in the 3D space.

For the generating of the target space tensor, the processor may be configured to select a voxel having a volume density exceeding a threshold from among voxels in the 3D space.

The processor may be configured to build each tensor set by factorizing the target space tensor into tensors of a dimension lower than a dimension of the target space tensor.

Each of the plurality of tensor sets may be a set of three vectors.

Each of the plurality of tensor sets may be a set of vectors and matrices.

The device may include a memory and the processor may be configured to generate the plurality of pieces of factor data corresponding to each basis tensor by merging the plurality of tensor sets based on basis tensors and store the plurality of pieces of factor data in the memory, for the generating of the point information, the processor may be further configured to load the plurality of pieces of factor data.

The generating of the target space tensor may based on an extraction of voxels corresponding to the 3D space from a pre-built neural scene representation (NSR) data cube or an NSR data cube built using a neural network.

The generation of the point information may be based on the plurality of pieces of factor data and the generating of the pixel information, in parallel with one or more additional respective generations of point information and pixel information for other pixels of an image of the 2D scene.

The device of claim 1 may include a memory storing instructions, which, when executed by the processor, configures the processor to perform the generating of the point information and the generating of the pixel information.

In a general aspect, here is provided a computer-implemented method that includes generating, for each of plural query inputs, point information using factor values individually extracted from a plurality of pieces of factor data for a corresponding query input and generating pixel information of a pixel position using the point information of points, and the plural query inputs are of the points, in a three-dimensional (3D) space, on a view direction from a viewpoint toward a pixel position of a two-dimensional (2D) scene image.

In a general aspect, here is provided a mobile terminal including an input/output interface configured to obtain plural query inputs for a plurality of points, in a three-dimensional (3D) space according to a viewpoint from a view direction for a two-dimensional (2D) scene and a processor configured to generate, for each of plural query inputs, point information using factors individually extracted from a plurality of pieces of factor data for a corresponding query input, generate, for each of the plural query inputs, pixel information related to the factor data to generate, and generate an image corresponding to the 2D scene.

Other features and aspects will be apparent from the following detailed description, the drawings, and the claims.

Figure 1:
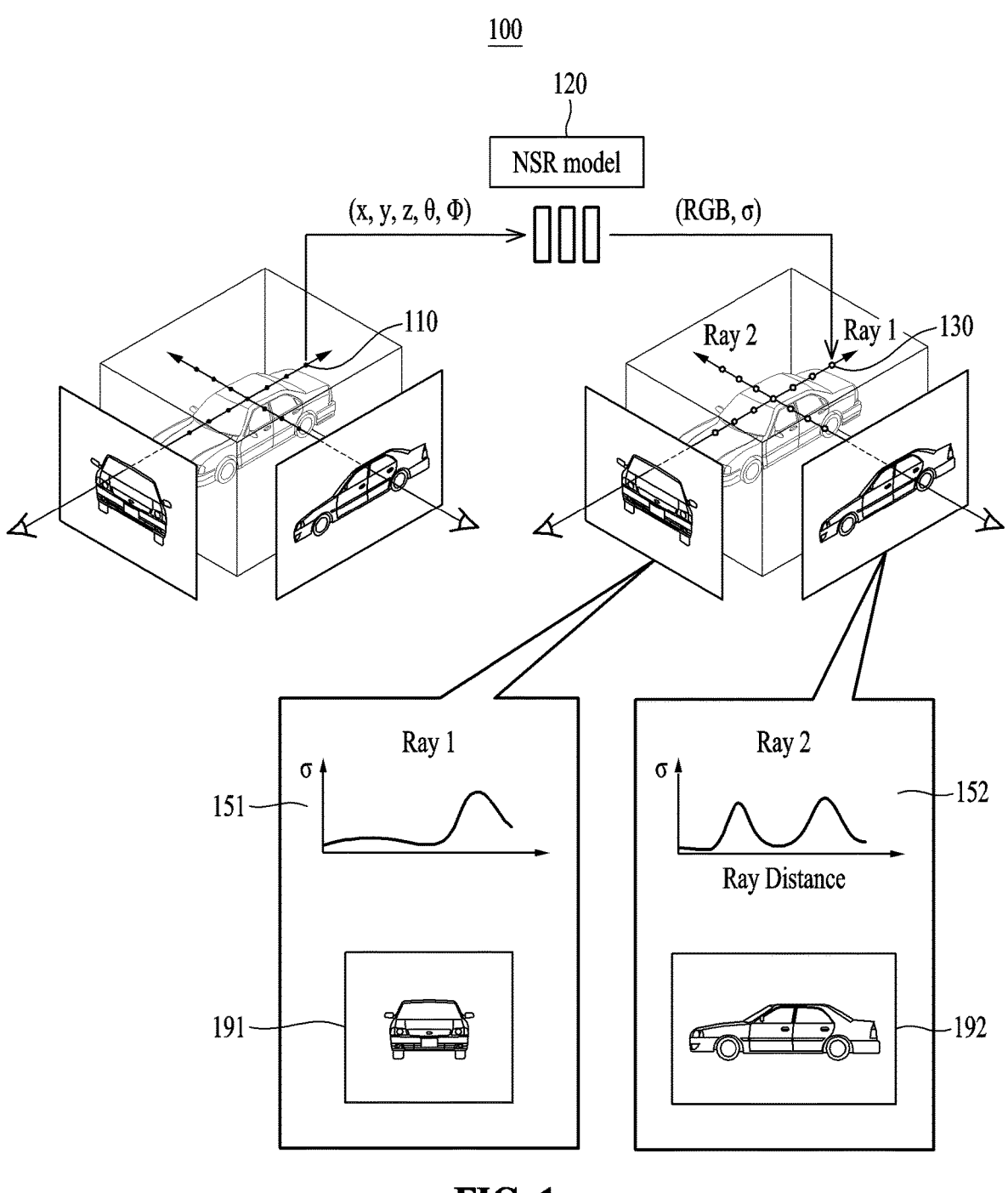
FIG. 1 illustrates an example of an electronic device with a neural scene representation according to one or more embodiments.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Unless otherwise defined, all terms, including technical and scientific terms, used herein have the same meaning as commonly understood by one of ordinary skill in the art to which this disclosure pertains specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

Machine learning rendering may include converting scene parameters into an output image using a machine learning model, in various examples. For example, a neural rendering may include an electronic device using a neural network. The scene parameters may be a one-dimensional (1D) input provided directly to the machine learning model or a two-dimensional (2D) input generated using classical computer graphics pipelines. Such a machine learning model, e.g., a deep neural deep neural network may observe a real scene and learn a method of modeling and rendering the scene. Neural scene representation data generated based on neural rendering may be used to generate a 2D scene image in one or more examples.

FIG. 1 illustrates an example 100 of an electronic device with a neural scene representation according to one or more embodiments.

According to an example, points in a three-dimensional (3D) space may be represented as neural scene representation (NSR) data. For example, an electronic device 100 may generate, from a query input 110 of each point in the 3D space, NSR data 130 of a corresponding point based on an NSR model 120. The models herein may be machine learning models, e.g., a deep neural network (DNN), designed and trained to output the NSR data from a query input.

Herein, electronic devices are representative of one or more processors configured to implement one or more, or any combination of, operations or methods described herein. In an example, the electronic device further comprises one or more memories that may store one or more machine learning models, such as those discussed herein. The one or more processors may be configured to execute instructions. The one or more memories may store the instructions, which when executed by the one or more processors configure the one or more processors to perform one or more, or any combination of operations of methods described herein.

The query input 110 may include coordinates representing a corresponding point in the 3D space and a direction of a view direction for each point. The view direction may be a direction (e.g., Ray 1 or Ray 2 of FIG. 1) passing through a pixel and/or points corresponding to the pixel from a viewpoint from which a two-dimensional (2D) scene to be synthesized and/or reconstructed is viewed. In FIG. 1, as an example of the query input 110, coordinates of (x, y, z) and direction information of (θ, φ) are shown. The coordinates of (x, y, z) may be coordinates according to the Cartesian coordinate system based on a predetermined origin point, and (θ, φ) may be angles formed between the view direction and two predetermined reference axes (e.g., the positive direction of the z-axis and the positive direction of the x-axis).

The NSR data 130 may be data representing scenes of the 3D space viewed from several view directions, and may include, for example, neural radiance field (NeRF) data. In a non-limiting example, the NSR data 130 may include color information and volume densities 151 and 152 of the 3D space for each point and for each view direction. The color information may include color values according to a color space (e.g., a red value, a green value, and a blue value according to an RGB color space). The volume densities 151 and 152, σ, of a predetermined point may be interpreted as a possibility (e.g., differential probability) that a ray ends at an infinitesimal particle of the corresponding point. In the graphs of the volume densities 151 and 152 shown in FIG. 1, the horizontal axis may denote a ray distance from a viewpoint along a view direction, and the vertical axis may denote the value of the volume density according to the distance. As a non-limiting example, the color value (e.g., RGB value) may also be determined according to the ray distance along the view direction will be described in further detail below. However, the NSR data 130 is not limited to the above example, and may vary according to the design.

The NSR data 130 may be stored which may correspond to training the NSR model 120 (e.g., the neural network) with 3D scene information. The NSR data 130 may be loaded which may correspond to outputting the NSR data 130 by inputting the query input 110 to the NSR model 120. The neural network for generating the NSR data 130 may have a multi-layer perceptron (MLP) structure. The neural network may be trained to output (RGB value, volume densities 151 and 152) of a sample point with respect to an input value (e.g., (x, y, z, θ, φ) of the corresponding sample point). For example, a view direction may be defined for each pixel of 2D scene images 191 and 192, and output values (e.g., the NSR data 130) of all sample points on the view direction may be calculated through a neural network operation. In FIG. 1, the 2D scene image 191 of a vehicle object viewed from the front and the 2D scene image 192 of the vehicle object viewed from the side are shown. The NSR data 130 described above may be pre-computed and stored for each possible sample position. A space corresponding to a 3D scene may be built as a 3D grid, and NSR data 130 for a corresponding voxel point at each voxel position in the grid may be pre-computed and stored. A collection of NSR data 130 stored in the 3D grid may also be referred to as an NSR data cube. An NSR data cube pre-computed for the 3D space may require a large memory space.

The electronic device may generate a 2D image using factor data generated based on factorization of the NSR data 130 cube. The electronic device may generate a 3D scene image of a 3D space, of which NSR data 130 is built, viewed from a predetermined new viewpoint at a photorealistic level of quality. The electronic device may reduce the amount of data required for generating the 2D image described above and also improve a speed at which the 2D image is generated. The factor data may be data generated based on factor values extracted by factorizing the NSR data cube. Building and using factor data will be described later with reference to FIG. 5.

Figure 2:
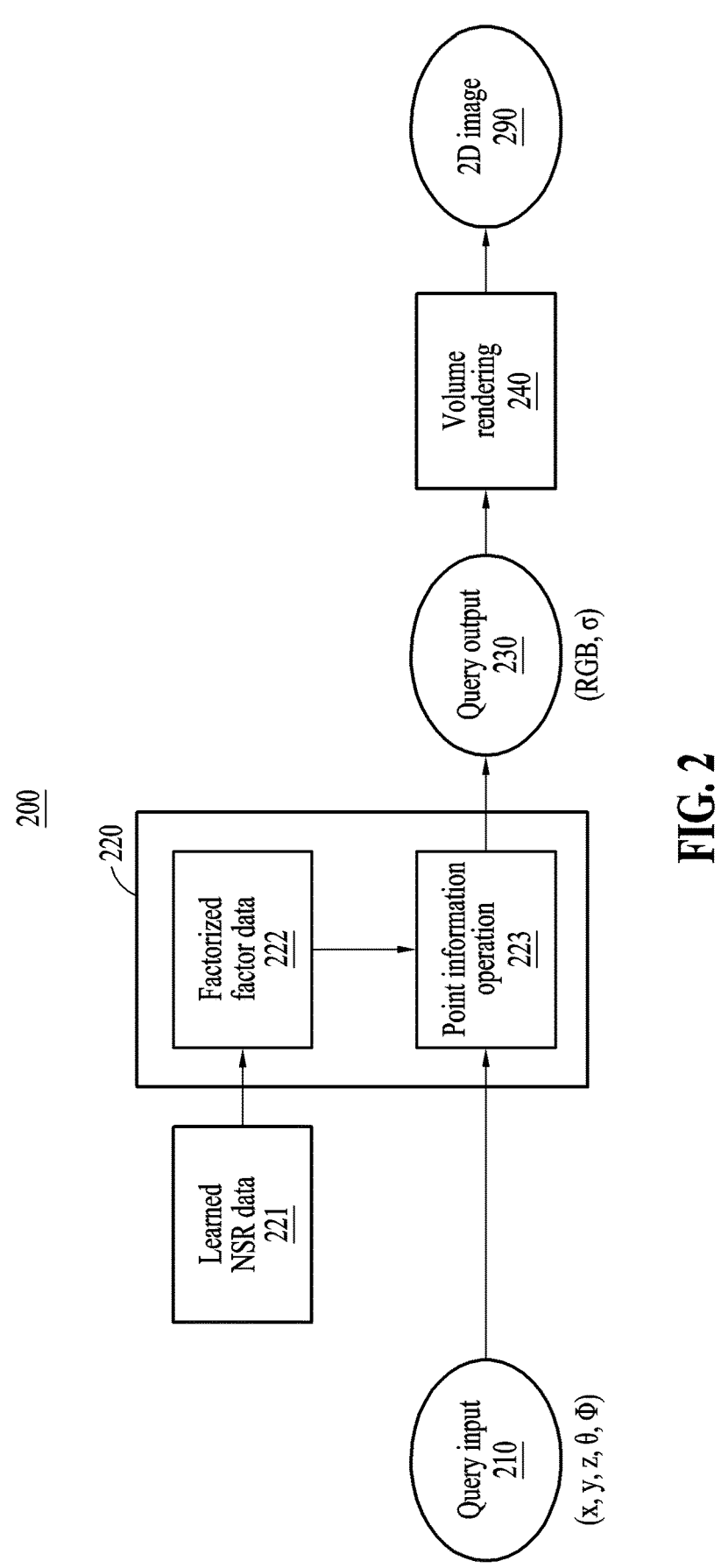
FIG. 2 illustrates an example of factorization of neural scene representation data and generation of an image using a point information operation according to one or more embodiments.

FIG. 2 illustrates an example of factorization of neural scene representation data and generation of an image using a point information operation according to one or more embodiments.

According to an example, an electronic device may generate a 2D image 290 from a query input 210 for a 3D space using factor data 222 obtained by factorizing NSR data 221 through an image generation operation 200. To generate the 2D image 290, the electronic device may define view directions from predetermined viewpoints toward each pixel of the 2D image 290. A viewpoint may be, for example, a position at which a camera having a predetermined field of view (FOV) can capture a scene corresponding to the 2D image 290. The electronic device may sample points (e.g., sample points) along a view direction in a 3D space. The electronic device may generate, for each pixel of the 2D image 290, the query input 210 including a view direction corresponding to a corresponding pixel and coordinates indicating each sample point on the view direction.

The electronic device may prepare the factor data 222 in advance. For example, the electronic device may obtain the factor data 222 before generating or processing the query input 210. Alternatively, the electronic device may obtain the factor data 222 before performing a point information operation 223. The electronic device may receive factor data 222 generated in advance by an external device (e.g., a server) and store the received factor data 222 in a memory. In a non-limiting example, the factor data 222 may be stored in the memory during a manufacturing of the electronic device. The factor data 222 may be generated based on factorization of the NSR data 221. Although FIG. 2 shows an example in which the NSR data 221 is factorized by a separate external device and the NSR model 220 includes only the point information operation 223 using the factor data 222, examples are not limited thereto.

For example, the electronic device may generate the factor data 222 by factorizing the learned NSR data 221 and storing the generated factor data 222. The electronic device may factorize the NSR data 221 before performing the point information operation 223 or generating the query input 210. The electronic device may generate the factor data 222 by factorizing the NSR data cube during a time (e.g., a waiting time) for which the generation of the 2D image 290 is not performed.

In the above example, the electronic device may obtain the pre-built NSR data 221 cube, to generate the factor data 222 during the waiting time. The electronic device may receive the NSR data 221 cube pre-built by the external device (e.g., the server). In a non-limiting example, the electronic device may autonomously build the NSR data 221 cube using a neural network. The neural network may be a machine learning model that is designed and trained to output the NSR data 221 from a point in a 3D space. The electronic device may receive learned parameters (e.g., connection weights between nodes) of the neural network from the external device and apply the received parameters to the neural network. The electronic device may generate a collection of the NSR data 221 for the 3D space by applying the trained neural network to the points in the corresponding 3D space. As described above, the collection of the NSR data 221 for the points (e.g., voxels) in the 3D space may be referred to as the NSR data cube. The operation of obtaining or generating the NSR data cube described above is merely an example, and examples are not limited thereto, and various NSR algorithms may be used. As a non-limiting example, building factor data based on an NSR data cube will be described in further detail below with reference to FIGS. 4 and 5.

The electronic device may perform the point information operation 223 using the pre-generated factor data 222. Point information may be information on a point corresponding to the query input 210, and may include color information and a volume density of the corresponding point. For example, in the image generation operation 200 shown in FIG. 2, the electronic device may extract factors corresponding to the query input 210 from the plurality of pieces of factor data

222. The electronic device may calculate point information corresponding to the query input 210 as a query output 230 using the extracted factors. The electronic device may calculate query outputs 230 for points along a view direction corresponding to one pixel of the 2D image 290. The query output 230 may include color information and a volume density. The factor data 222 for color and the factor data 222 for volume density may be individually built. The electronic device may calculate color information corresponding to the query input 210 using the factor data 222 for color. The electronic device may calculate a volume density corresponding to the query input 210 using the factor data 222 for volume density.

In a non-limiting example, the electronic device may perform volume rendering 240 using the query outputs 230 calculated for the same pixel. Volume rendering 240 may include an operation of accumulating color information and volume densities according to a view direction. The electronic device may determine, for the query inputs 210 along the view direction based on the NSR model 220 (e.g., the point information operation 223), pixel information corresponding to the view direction by accumulating the color information and volume densities calculated for the points of the corresponding view direction. The electronic device may determine pixel values (e.g., color values) of pixels included in the 2D image 290 by performing volume rendering 240 for each pixel of the 2D image 290. The electronic device may generate the 2D image 290 by obtaining the pixel values for all pixels of the 2D image.

According to an example, the electronic device may perform the point information operation 223 and volume rendering 240 for each pixel in parallel, thereby increasing the speed of generating the 2D image 290. Further, a processor of the electronic device may include a central processing unit (CPU) or a graphics processing unit (GPU). The electronic device may perform any one or any combination of generation of the NSR data 221, factorization of the NSR data 221, and generation of the factor data 222 using the CPU during the waiting time. The electronic device may perform the point information operation using the GPU.

Figure 3:
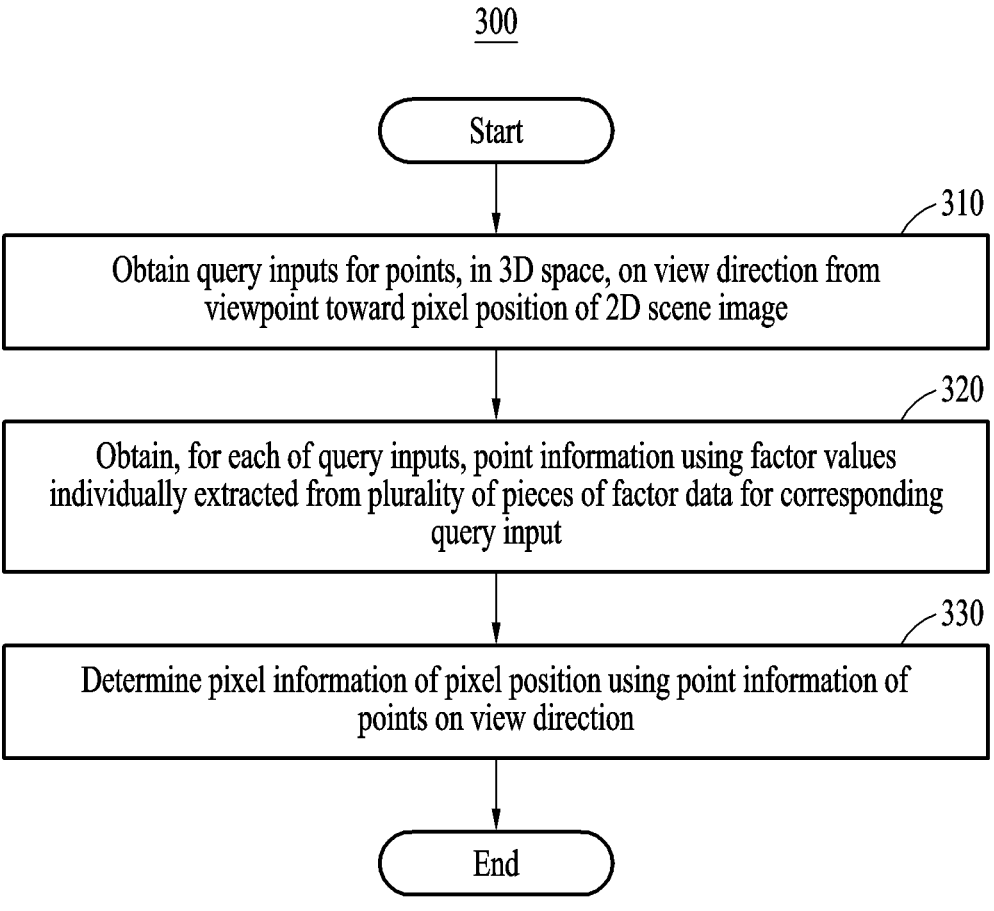
FIG. 3 illustrates an example of an image generating method according to one or more embodiments.

FIG. 3 illustrates an example of an image generating method 300 according to one or more embodiments.

According to an example, an electronic device may generate a 2D image using a pre-built factor data (e.g., the factor data was built in advance). The plurality of pieces of factor data may be built based on a factorization of a tensor representing a 3D space. As a non-limiting example, building pieces of factor data will be described in further detail below with reference to FIG. 4.

For example, in operation 310, the electronic device may obtain query inputs for points, in a 3D space, on a view direction from a viewpoint toward a pixel position of a 2D scene. A query input for each point may include coordinates representing a corresponding point in the 3D space and direction information of a view direction. The 2D scene may be a scene whose image is to be generated.

In operation 320, the electronic device may obtain, for each of the query inputs, point information using factors individually extracted from the plurality of pieces of factor data for a corresponding query input. The electronic device may calculate the point information using a vector outer product of the factors individually extracted from the plurality of pieces of factor data. For example, the electronic device may calculate, for each query input, color information of a point corresponding to a corresponding query input based on a plurality of pieces of factor data related to color.

The electronic device may calculate, for each query input, volume density information of a point corresponding to a corresponding query input based on a plurality of pieces of factor data related to volume density. Color information and volume density information of a point corresponding to a query input may be calculated independently of each other.

Subsequently, in operation 330, the electronic device may determine pixel information of the pixel position using the point information of the points on the view direction. For example, the electronic device may determine a color value of the pixel position to be the pixel information of the pixel position using the point information of the points. The electronic device may generate an image corresponding to the 2D scene by repeating the determining of the color value for pixel positions included in the 2D scene.

Figure 4:
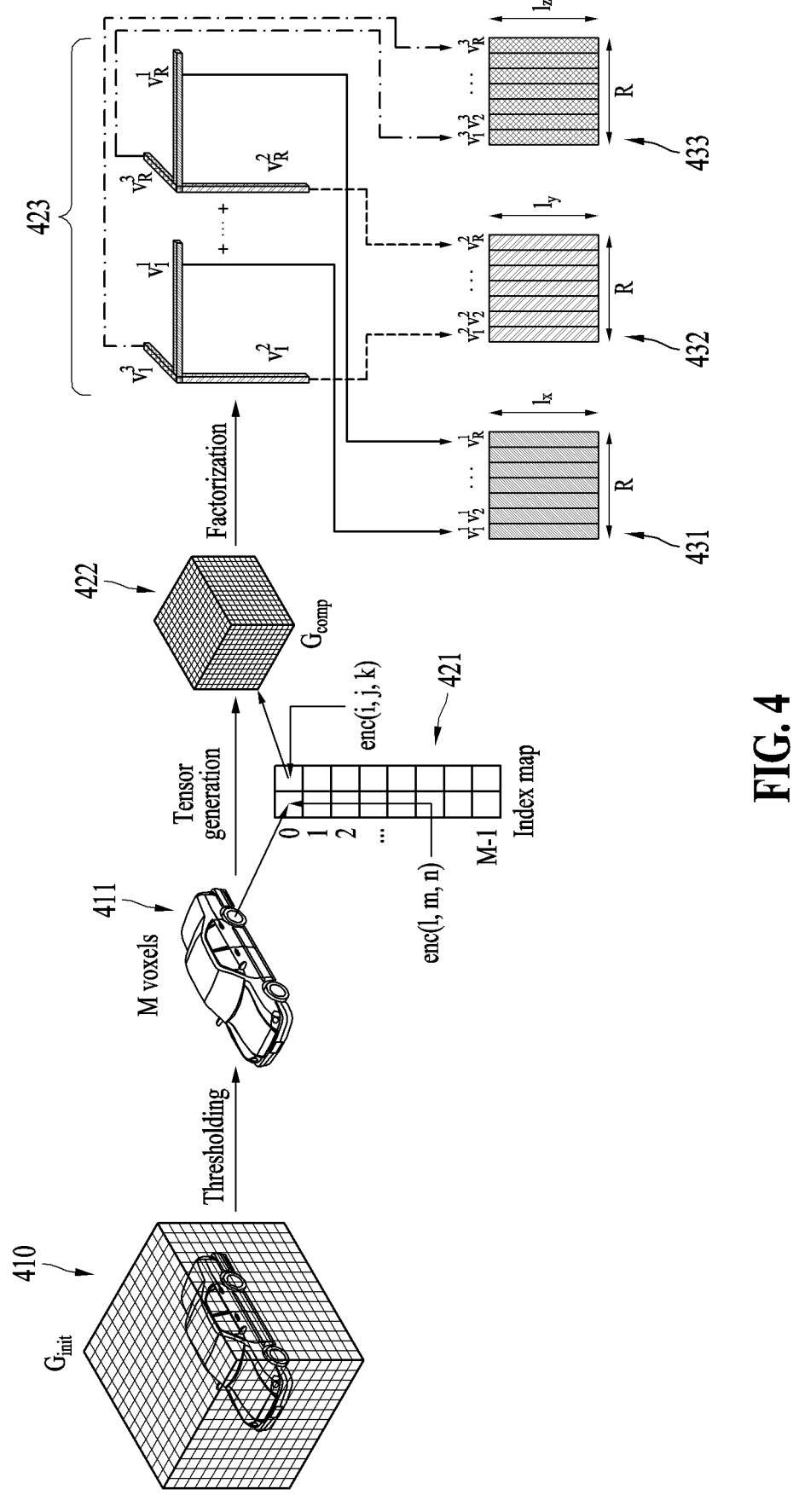
FIG. 4 illustrates an example of factorization of neural scene representation data according to one or more embodiments.

FIG. 4 illustrates an example of factorization of neural scene representation data according to one or more embodiments.

According to an example, an electronic device may generate a target space tensor 422 representing a 3D space 410. For example, the electronic device may extract voxels corresponding to the 3D space 410 from an NSR data cube. Each voxel in an initial grid $G_{init}$ corresponding to the 3D space 410 may include point information. Each voxel in the initial grid $G_{init}$ corresponding to the 3D space 410 may have NSR data (e.g., volume density information and color information). The NSR data for each voxel may be a value from a result that was calculated for a point of a corresponding voxel by an NSR algorithm selected as described above. In FIG. 4, an example in which the initial grid $G_{init}$ corresponding to the 3D space 410 is one of a first grid having color information $C_{RGB}$ as a voxel value and a second grid having volume density information $\sigma$ as a voxel value will be described below. The first grid and the second grid may be different from each other. Through the first grid and the second grid that are different from each other, factorization, obtaining point information using factor data, and volume rendering, which will be described in further detail below, may be individually performed for volume density information and color information.

FIG. 4 provides an example of generating factor data in the case where a voxel of the initial grid $G_{init}$ has volume density information (e.g., a volume density value) In another example, the following description may include a case where a voxel of the initial grid $G_{init}$ has color information (e.g., a scalar value indicating a color expressed by a combination of RGB). A scalar value indicating a color may be a color code, for example, HEX code. However, examples are not limited thereto. In addition, a voxel value of the initial grid $G_{init}$ is not limited to the above example. A voxel value of the initial grid $G_{init}$ may have an intermediate feature vector to be used to calculate color information $C_{RGB}$ and volume density information $\sigma$. The intermediate feature vector may be a vector including a value representing an abstracted feature of the color information $C_{RGB}$ and the volume density information $\sigma$. The intermediate feature vector may be reconstructed to the color information $C_{RGB}$ and the volume density information $\sigma$ through an additional machine learning model, a non-limiting example of which will be described in further detail below.

The electronic device may generate the target space tensor 422 based on the extracted voxels. For example, the electronic device may generate the target space tensor 422 in which the 3D space 410 is compressed by extracting a portion of the voxels in the 3D space 410. The electronic device may generate the target space tensor 422 by selecting a voxel having a volume density (e.g., $\sigma(l, m, n)$) that exceeds a threshold (e.g., $\sigma_{thres}$) from among the voxels in the 3D space 410. Here, l, m, and n are integers greater than or equal to "0", and may be indices for each axis (e.g., x-axis, y-axis, or z-axis) corresponding to the coordinates of a corresponding voxel in the initial grid $G_{init}$. In FIG. 4, an example of selecting M voxels 411 is shown. Here, M may be an integer greater than or equal to "1". A computed grid $G_{comp}$ of the target space tensor 422 may include voxels more than the plurality of voxels 411 selected. For example, the target space tensor 422 may be expressed by a grid having $p^3$ voxels, where p may be an integer greater than or equal to "1". The target space tensor 422 may have a dimension of p×p×p. Here, $(p-1)^3 \leq M \leq p^3$ may be satisfied.

While generating the target space tensor 422, the electronic device may store a mapping relationship between the voxels in the grid of the 3D space 410 and the voxels of the target space tensor 422. For example, the mapping relationship between the positions, of the voxels 411 extracted from the grid initial $G_{init}$ corresponding to the 3D space 410, in the initial grid $G_{init}$ and the positions in the target space tensor 422 may be determined based on encoding according to Equations 1 and 2.

$$\text{enc}(l,m,n)=q^2 \cdot l+q \cdot m+n \qquad \text{Equation 1:}$$

$$\text{enc}(i,j,k)=p^2 \cdot i+p \cdot j+k=e \qquad \text{Equation 2:}$$

In Equation 1 above, q denotes the resolution of one axis (e.g., the number of voxels along one axis) of the initial grid $G_{init}$ corresponding to the 3D space 410. In Equation 2, p denotes the resolution of one axis (e.g., the number of voxels along one axis) of the grid computed $G_{comp}$ corresponding to the target space tensor 422. Indices of coordinates according to each axis of the initial grid $G_{init}$ corresponding to the 3D space 410 may be 1, m, and n. In Equation 2, I, j, and k denote indices of coordinates according to each axis of a target tensor space. In addition, i, j, and k may be integers greater than or equal to """". In an example, e denotes a value obtained by encoding the position of a corresponding voxel based on the indices of coordinates according to the target space tensor 422. In Equations 1 and 2 above, enc( ) denotes the same encoding function. As shown in Equation 1 and Equation 2 above, the two values of results including enc(l,m,n) and enc(i,j,k) may be different from each other, but may be values obtained by encoding the position of the same voxel. An index map 421 may store a mapping relationship between enc(l,m,n) and enc(i,j,k).

Figure 5:
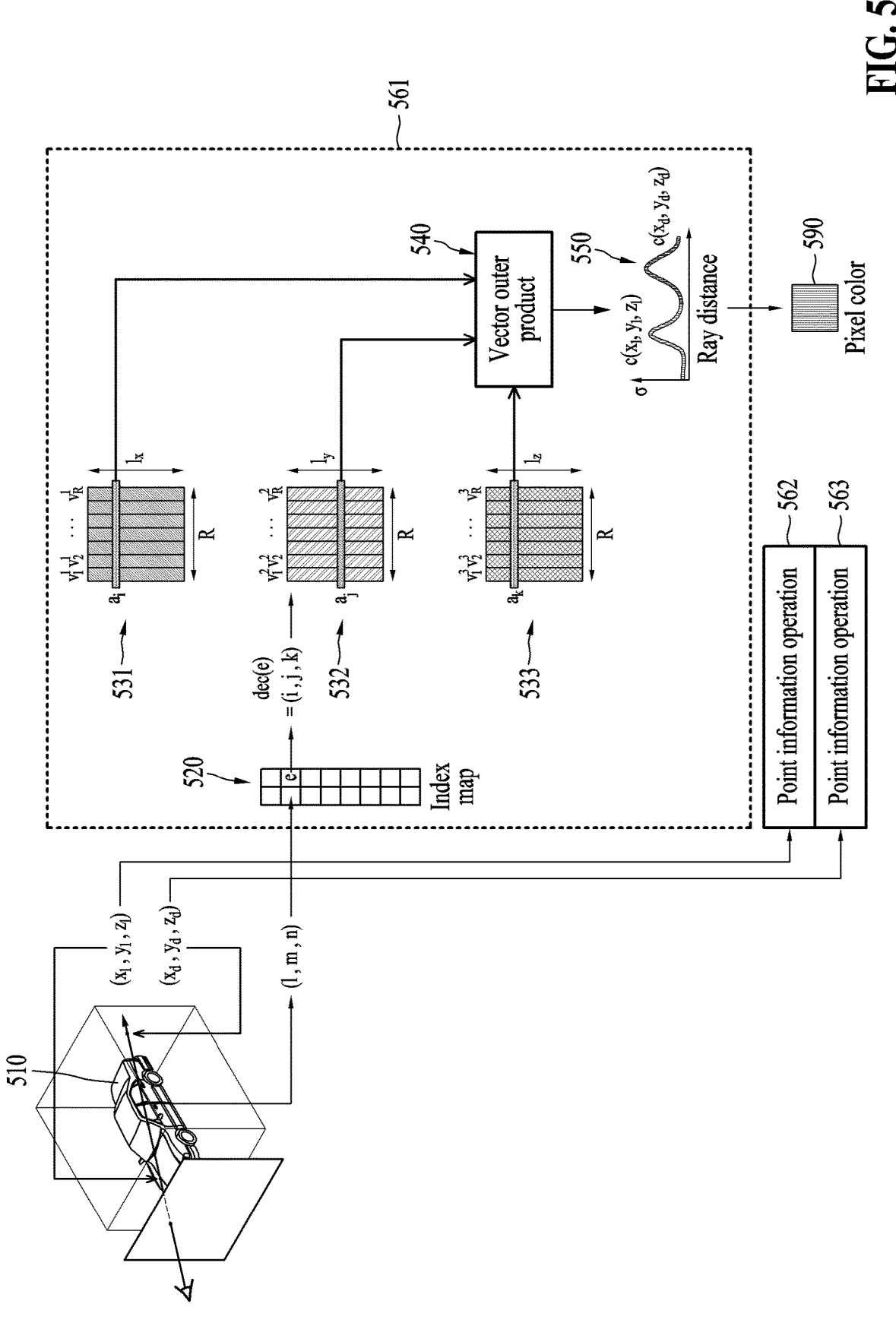
FIGS. 5 and 6 illustrate examples of operations using factor data generated based on factorization of neural scene representation data according to one or more embodiments.
Figure 6:
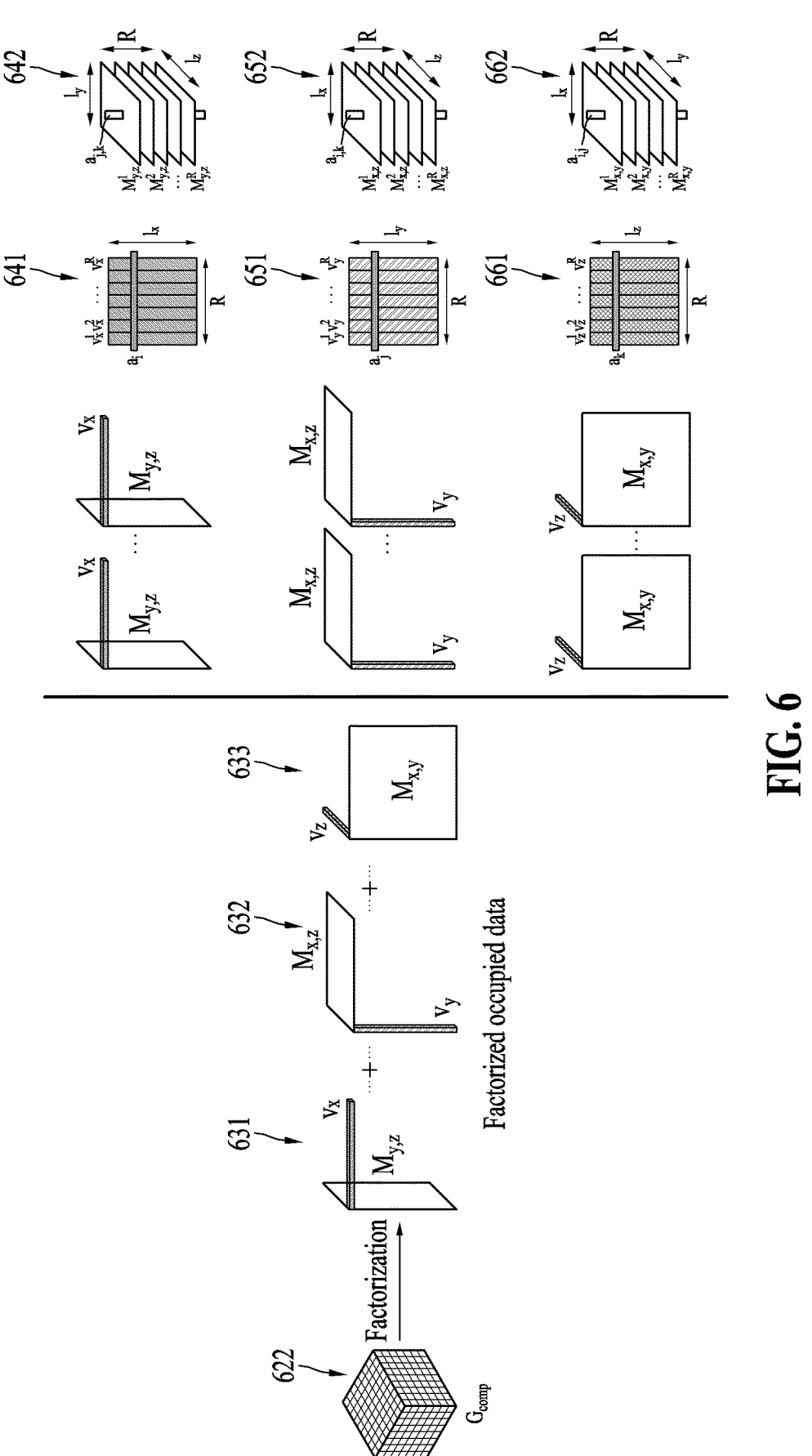

The electronic device may factorize the target space tensor 422 into a plurality of tensor sets 423 (e.g., R tensor sets). For example, the electronic device may generate each tensor set by factorizing the target space tensor 422 into tensors of a dimension lower than a dimension of the target space tensor 422. The electronic device may factorize the target space tensor 422 into the plurality of tensor sets 423 through various methods. For example, each of the plurality of tensor sets 423 may be configured as a set of three tensors or a set of two tensors. The set of three tensors may be a set of three vectors. In the set of two tensors, a dimension of one tensor may be higher than a dimension of the other tensor. For example, the set of two tensors may be a set of vectors and matrices. In FIGS. 4 and 5, CANDECOMP/PARAFAC (CP) factorization is described as an example of factorizing the target space tensor 422 into tensor sets each including three vectors. Factorization may also be referred to as decomposition. In FIG. 6, block term decomposition (BTD) is described as an example of factorizing the target space tensor 422 into sets each including two tensors.

For example, the electronic device may factorize the target space tensor 422 into the plurality of tensor sets 423 according to three basis tensors (e.g., $v^1$, $v^2$, and $v^3$ as basis vectors) through CP decomposition. A basis tensor may also be referred to as a tensor component. The target space tensor 422 may be factorized into the sum of $$v_r^1 \circ v_r^2 \circ v_r^3$$

which is an outer product of the three tensors included in each of the plurality of tensor sets 423, as expressed by Equation 3 below.

$$\sum_{r=1}^{R} v_r^1 \circ v_r^2 \circ v_r^3 \qquad \text{Equation 3}$$

In Equation 3 above, $$v_r^1, v_r^2, \text{ and } v_r^3$$

denote a tensor corresponding to the basis tensor $v^1$, a tensor corresponding to the basis tensor $v^2$, and a tensor corresponding to the basis tensor $v^3$ in an r-th tensor set, respectively. In Equation 3, $\circ$ denotes an element-wise multiplication (or Hadarmard multiplication). For the aforementioned tensor factorization, the electronic device may update the tensor sets 423 based on an objective function as in Equation 4 below with respect to the target space tensor 422.

$$\left\| T - \sum_{r=1}^{R} v_r^1 \circ v_r^2 \circ v_r^3 \right\| \qquad \text{Equation 4}$$

In Equation 4 above, T denotes the target space tensor 422. The electronic device may update the tensor sets 423 so that the objective function according to Equation 4 may be minimized. Data (e.g., the tensor sets 423) obtained by factorizing original tensor data (e.g., the target space tensor 422) may be smaller in size than the original tensor data. Accordingly, the obtained data may be loaded into an electronic device and may require a relatively small amount of memory.

According to an example, the electronic device may build the plurality of obtained tensor sets 423 as a plurality of pieces of factor data. For example, the electronic device may generate factor data corresponding to each basis tensor by merging the plurality of tensor sets 423 based on the basis tensors. The basis tensors may be basis vectors or basis matrices. An example of the basis tensors being basis vectors is described with reference to FIGS. 4 and 5, and an example of the basis tensors being basis vectors and basis matrices is described with reference to FIG. 6.

The electronic device may merge, for each basis tensor, tensors corresponding to a corresponding basis tensor from the tensor sets 423. The electronic device may generate, for a predetermined basis tensor, generate factor data corresponding to a corresponding basis tensor by combining as many tensors as provided in the tensor sets 423. For example, as shown in FIG. 4, the electronic device may generate first factor data 431 by merging tensors $$v_r^1$$

corresponding to the first basis tensor $v^1$. The first factor data 431 may have a dimension (e.g., $R \times l_x$) corresponding to R which is the number of tensor sets 423 and $l_x$ which is the dimension of the first basis tensor $v^1$. The electronic device may generate second factor data 432 by merging tensors $$v_r^2$$

corresponding to the second basis tensor $v^2$. The second factor data 432 may have a dimension (e.g., $R \times l_y$) corresponding to R which is the number of tensor sets 423 and $l_y$ which is the dimension of the second basis tensor $v^2$. The electronic device may generate third factor data 433 by merging tensors $$v_r^3$$

corresponding to the third basis tensor $v^3$. The third factor data 433 may have a dimension (e.g., $R \times l_z$) corresponding to R which is the number of tensor sets 423 and $l_z$ which is the dimension of the third basis tensor $v^3$. Accordingly, the electronic device may build as many pieces of factor data 431, 432, and 433 as the basis tensors (e.g., three pieces of factor data).

In an example, the electronic device that builds factor data from the target space tensor 422 was described above with reference to FIG. 4. However, examples are not limited thereto. In another example, the electronic device may receive pre-built factor data from an external device and store the received factor data as described above in FIG. 3. The electronic device may input the factor data into a texture data format of the GPU and perform a shader operation, which will be described in further detail below. The electronic device may calculate point information (e.g., color information, volume density information, or intermediate feature information) from factors corresponding to points to be reconstructed through the shader operation.

FIGS. 5 and 6 illustrate examples of operations using factor data generated based on factorization of neural scene representation data according to one or more embodiments.

FIG. 5 shows a point information operation using factor data corresponding to the basis vectors described above with reference to FIG. 4.

According to an example, an electronic device may sample points along a view direction from a viewpoint toward a predetermined pixel in a 2D scene. The electronic device may determine a query input corresponding to each of the sampled points. The query input may include direction information indicating the view direction as well as coordinate information (e.g., $(x_1, y_1, z_1)$, $(l, m, n)$, $(x_d, y_d, z_d)$) of the sampled point as described above. In the example of FIG. 5, the coordinate information may include coordinate indices (e.g., integer indices) corresponding to coordinate values of respective axes, rather than physical coordinates. However, examples are not limited thereto, and the coordinate information may include physical coordinates according to a design. The electronic device may calculate point information (e.g., color information and volume density information) for the sampled points.

First, a 3D space 510 may be compressed into a target space tensor as in the example described above with reference to FIG. 4. Thus, the electronic device may interpret coordinate information of a point in the 3D space 510 as coordinate information of the target space tensor. For example, the electronic device may convert the coordinate information of the point in the 3D space 510 into the coordinate information of the target space tensor based on an index map 520. The electronic device may obtain a value by encoding coordinate indices (l, m, n) of the 3D space 510 using Equation 1 above. The electronic device may retrieve the value obtained by encoding the coordinate indices of the 3D space 510 from the index map 520. As described above with reference to FIG. 4, the index map 520 may represent a mapping relationship in position between voxels of a grid of the 3D space 510 and voxels of the target space tensor. The electronic device may obtain a value (e.g., e) by encoding target space coordinate indices (e.g., coordinate indices of the point in the target space tensor) corresponding to the coordinate indices of the 3D space 510. The electronic device may convert the obtained value e into the coordinate indices (i, j, k) of the target space tensor using Equation 5 below.

$$\mathrm{dec}(e)=(e/p^2,(e-p^2i)/p,(e-p^2i)\% \ p)=(i,j,k) \qquad \text{Equation 5:}$$

In Equation 5 above, dec( ) denotes a decoding operation, // is a symbol for calculating a quotient in division, and % is a symbol for calculating a remainder in division. e denotes the encoded value of target space coordinates, and p denotes the length (e.g., the number of voxels) along one axis of the target space tensor. In Equation 5, i denotes a coordinate index of one axis (e.g., the x-axis) corresponding to the encoded value e, and $i=e/p^2$ may be satisfied. In Equation 5, j and k denote coordinate indices of different axes (e.g., the y-axis and the z-axis), and conditions such as $j=(e-p^2i)/p$ and $k=(e-p^2i) \% \ p$ may be satisfied. For reference, when the 3D space 510 is compressed into the target space tensor as shown above in FIG. 4, the electronic device may perform the decoding described above to convert the coordinates (l, m, n) of the 3D space 510 into the coordinates (i, j, k) of the target space tensor. When no space compression is performed, the coordinate interpretation and/or decoding operation described above may be omitted.

The electronic device may extract factors individually from each of a plurality of pieces of factor data. The electronic device may extract a factor of a position corresponding to a query input from each input data. As described above, the electronic device may extract a factor corresponding to a position (e.g., a coordinate index) along one axis of the target space tensor from factor data corresponding to the axis, for each tensor set. For example, the electronic device may extract a factor $a_i$ corresponding to an x-axial coordinate index i from first factor data 531. The electronic device may extract a factor $a_j$ corresponding to a y-axial coordinate index j from second factor data 532. The electronic device may extract a factor $a_k$ corresponding to a z-axial coordinate index k from third factor data 533.

The electronic device may calculate the point information of the point corresponding to the query input using the extracted factors. The electronic device may calculate the point information through a vector outer product 540 between the factors. For example, the electronic device may calculate color information using factors extracted from factor data related to color. The electronic device may calculate volume density information using factors extracted from factor data related to volume density. In a non-limiting example, the calculating of a volume density will be described for in further detail below. For example, the electronic device may calculate the vector outer product 540 for the factors as shown in Equation 6 below.

$$\sum_{r=1}^{R} a_i(r) \circ a_j(r) \circ a_k(r) \qquad \text{Equation 6}$$

Equation 6 above may represent the vector outer product 540 of the extracted factors. In equation 6, $a_i(r)$ denotes a factor value corresponding to an r-th tensor set in the factor $a_i$. The factor value may be a tensor. Similarly, $a_j(r)$ denotes a factor value corresponding to the r-th tensor set in the factor $a_j$, and $a_k(r)$ denotes a factor value corresponding to the r-th tensor set in the factor $a_k$. In Equation 6, the sum of element-wise products of factor values belonging to the same tensor set may be calculated. A result calculated according to Equation 6 may be point information (e.g., a color value, a volume density value, or an intermediate feature value) of the point indicated by the query input. The result calculated in Equation 6 may be a tensor value corresponding to coordinates (i, j, k) of a target space tensor T, and may correspond to T(i, j, k).

The electronic device may obtain color and volume density curves of points according to a view direction. For example, the electronic device may repeat the extraction of factors and the vector outer product 540 between the extracted factors, as described above, for the sampled points according to the view direction, thereby obtaining color values (e.g., c(l, m, n)) and volume density values (e.g., σ(l, m, n)) for all the sampled points. When the total number of sampled points is $S_n$, the electronic device may obtain $S_n$ color values and $S_n$ volume density values for the $S_n$ query inputs in total.

According to an example, the electronic device may employ a GPU to accelerate a point information operation 561. For example, the electronic device may perform the point information operation 561 using a shader acceleration function of the GPU. For example, the electronic device may convert factor data into a texture format of a shader. The texture format may be a data format supported for storing a texture in the shader. Factor data generated based on factorization of NSR data may be small in size and thus, the factor data may be loaded to a GPU memory. When a basis tensor of the factor data is a vector, the factor data may be stored in the GPU memory in a one-dimensional (1D) texture format. When the basis tensor of the factor data is a matrix, the factor data may be stored in the GPU memory in a 2D texture format. Here, when a value stored in each element of the factor data is not a scalar value, but a tensor value (e.g., a feature vector) of one dimension or higher, the texture format may be set in view of the tensor dimension. For example, if the texture format is 8-bit RGBA, a feature vector of length 4 may be stored per texture. Thus, if a feature vector of length 12 is to be stored, the feature vector may be divided into three textures and stored in the GPU memory. RGBA may be a red (R) channel, a green (G) channel, a blue (B) channel, and an alpha (A) channel.

The electronic device may perform point information operations 561, 562, and 563 in parallel. In a non-limiting example, point information operation 561 of the position (l, m, n) was described above in FIG. 5. However, the point information operations 562 and 563 of the remaining positions $(x_1, y_1, z_1)$ and $(x_d, y_d, z_d)$ may include the same or similar operations except that they are performed for other pixels. The electronic device may perform obtaining the point information based on the plurality of pieces of factor data and determining pixel information 590, in parallel for pixels of a 2D scene image. For example, the electronic device may perform a pixel parallelization operation through a fragment shader (e.g., a pixel shader). The fragment shader may be a shader operation employed by the GPU. In the case of using the fragment shader, the electronic device may call a texture value (e.g., the factor value corresponding to a corresponding coordinate in the factor data described above) corresponding to $(x, y, z)$ from query inputs of sample points (e.g., points along a view direction) corresponding to each pixel. The electronic device may perform the vector outer product 540 between texture values. For example, the electronic device may obtain the $T(x, y, z)$ value of the target space tensor T by calling a 1D texture $\hat{x}$, a 1D texture $\hat{y}$, and a 1D texture $\hat{z}$ separately and performing the vector outer product 540 thereon. Here, the coordinates $\hat{x}$, $\hat{y}$, and $\hat{z}$ of the texture has a range of $[0, 1]$, and thus, values obtained by normalizing $x$, $y$, and $z$ values may be used. In the examples illustrated in FIGS. 4 and 5, $x$, $y$, and $z$ may be $i$, $j$, and $k$, respectively. In a non-limiting example where a 1D texture $\hat{x}$ and a 2D texture $\hat{y}$ and $\hat{z}$, the electronic device may calculate a tensor value by calling and multiplying the value of the 1D texture $\hat{x}$ and the value of the 2D texture $\hat{y}$ and $\hat{z}$.

The electronic device may calculate a color value $c(l, m, n)$ and a volume density value $\sigma(l, m, n)$ of each sample point in view of the tensor value (e.g., the intermediate feature value) of the target space tensor and direction information (e.g., $\theta$ and $\phi$ of the view direction). For example, the electronic device may determine the point information described above using a separate machine learning model (e.g., a neural network) designed and trained to output a color value and a volume density from an intermediate feature value and direction information.

However, shader acceleration is not limited to performing pixel-wise parallelization. The electronic device may group a plurality of pixels into batches through a compute shader and perform batch-wise parallelization.

The electronic device may determine the pixel information 590 based on obtained color and volume density curves 550. The pixel information 590 may indicate a color value determined for a corresponding pixel position. For example, the electronic device may accumulate color values and volume density values of multiple sample points through a volume rendering equation. Volume rendering may be an operation of visualizing discrete sampling data in the form of a 3D scalar field into a 2D projection. For example, volume rendering may include an operation of projecting color values of points on a view direction to a pixel position corresponding to the view direction based on volume density values according to the view direction. Accordingly, the electronic device may determine a final color value of a corresponding pixel based on the color values and volume density values according to the view direction. The electronic device may determine the pixel information 590 of all pixels in response to shader acceleration for each pixel being all completed. The electronic device may generate a 2D scene image by obtaining color values of all pixels of a 2D scene.

The electronic device may perform a query for each view direction and for each point at a speed enabling real-time rendering. The factor data stored in the electronic device may occupy a compact memory size compared to an NSR data cube.

A non-limiting example in which a pre-built factor data including point information of a sampled point (e.g., a voxel requested to be queried) has been described above. However, examples are not limited thereto. When information on a color and/or a volume density corresponding to the requested voxel is not included in the factor data, the electronic device may perform an interpolation (e.g., trilinear interpolation) using surrounding information. For example, the electronic device may determine surrounding query inputs corresponding to voxels in the vicinity of the requested voxel among the voxels in the 3D space 510 based on an absence of the requested voxel in the factor data. The electronic device may calculate point information corresponding to the requested voxel using pieces of surrounding point information obtained based on the surrounding query inputs. The surrounding point information for the surrounding query inputs may be obtained through an operation which may be the same as or similar to that described for the query input with reference to FIG. 5 as described above. The electronic device may determine a statistical value (e.g., a minimum value, a mean value, a median value, or a maximum value) determined based on the pieces of surrounding point information to be the point information corresponding to the voxel requested to be queried. The electronic device may perform the trilinear interpolation described above individually for color values and volume density values.

In non-limiting examples, the voxel values of the grid corresponding to the 3D space 410, 510 may be a scalar value as described above with reference to FIGS. 4 and 5. However, examples are not limited thereto. The voxel value of the grid may have a vector form as well as a scalar value form. For example, color information may be a color code (e.g., hex code) indicating a color, or may include a color vector that is a combination of values for each color channel (e.g., RGB value). When the voxel value of the grid is a scalar value, the target space tensor described above with reference to FIG. 4 above may be a 3D tensor. When the voxel value of the grid is a vector (e.g., a color vector or an intermediate feature vector), the dimension of the feature vector may be added, such that the target space tensor may be a four-dimensional (4D) tensor. When the voxel value of the grid has a tensor value (e.g., a color vector value) having a dimension higher than one dimension, the description may apply identically or similarly except that the dimensions of basis tensors increase according to the tensor dimension of the voxel value of the grid. This is because the scalar value is a zero-dimensional (0D) tensor and the vector is a 1D tensor.

In FIG. 5, a volume density value may be directly obtained based on the vector outer product 540 and the factor data related to the volume density information. Similarly, a color value may be directly obtained based on the vector outer product 540 and the factor data related to the color information. The volume density value and the color value may be obtained through the point information operation 561 which is individually performed. However, examples are not limited thereto. When each voxel value of the target space tensor has an intermediate feature vector, the electronic device may reconstruct corresponding color information and volume density information from the intermediate feature vector. For example, the electronic device may output the color value (e.g., a color code or a color vector) and the volume density value from the intermediate feature vector using a separate additional machine learning model (e.g., a neural network). The intermediate feature vector may include abstracted feature values of the color information and the volume density information. The additional machine learning model may be a model (e.g., a neural network) designed and trained to output volume density information and color information from an intermediate feature vector. In addition, the additional machine learning model may be designed and trained to output volume density information and color information from a view direction and an intermediate feature vector. The electronic device may obtain an intermediate feature vector based on the vector outer product 540 and the factor data for the intermediate feature vector, and convert the intermediate feature vector into the volume density information and the color information.

FIG. 6 illustrates an example of a target space tensor 622 factorized into tensor sets including a 2D tensor and a 1D tensor according to one or more embodiments.

For example, each of the plurality of tensor sets may be a set of vectors and matrices. As shown in FIG. 6, a basis tensor may include a first basis vector $v_x$, a first basis matrix $M_{y,z}$, a second basis vector $v_y$, a second basis matrix $M_{x,z}$, a third basis vector $v_z$, and a third basis matrix $M_{x,y}$. The tensor sets may be a tensor set 631 in which the first basis vector $v_x$ and the first basis matrix $M_{y,z}$ are combined, a tensor set 632 in which the second basis vector $v_y$ and the second basis matrix $M_{x,z}$ are combined, and a tensor set 633 in which the third basis vector $v_z$ and the third basis matrix $M_{x,y}$ are combined.

Tensor sets of the same base tensor may be grouped together. For example, factor data 641 may be built by grouping tensors of the first base vector $v_x$ together, and factor data 642 may be built by grouping tensors of the first basis matrix $M_{y,z}$ together. The dimension of the factor data 641 may correspond to R, which is the total number of tensor sets, and $1_x$, which is the length of the first basis vector $v_x$. The dimension of the factor data 642 may correspond to $1_y$ and $1_z$, which are the dimension of the first basis matrix $M_{y,z}$, and R, which is the number of tensor sets.

Factor data 651 may be built by grouping tensors of the second basis vector $v_y$ together, and factor data 652 may be built by grouping tensors of the second basis matrix $M_{x,z}$ together. The dimension of the factor data 651 may correspond to $1_y$, which is the length of the second basis vector $v_y$, and R, which is the number of tensor sets. The dimension of the factor data 652 may correspond to $1_x$ and $1_z$, which are the dimension of the second basis matrix $M_{x,z}$, and R, which is the number of tensor sets.

Factor data 661 may be built by grouping tensors of the third basis vector $v_z$ together, and factor data 622 may be built by grouping tensors of the third basis matrix $M_y$ together. The dimension of the factor data 661 may correspond to $1_z$, which is the length of the third basis vector $v_z$, and R, which is the number of tensor sets. The dimension of the factor data 662 may correspond to $1_x$ and $1_y$, which are the dimension of the third basis matrix $M_{x,y}$, and R, which is the number of tensor sets.

As described above with reference to FIGS. 4 and 5, the operation of factorizing the target space tensor 622 into tensor sets and building factor data may be performed in advance by an external device or an electronic device.

The electronic device may calculate point information based on the factor data 641, 642, 651, 652, 661, and 662 shown in FIG. 6. The electronic device may calculate point information (e.g., a color value, a volume density value, or an intermediate feature value as a tensor value) for a point requested with a query input (e.g., a point at coordinates (i,j,k) in the target space tensor 622). The electronic device may calculate point information through a vector outer product of factor values corresponding to a requested point in each piece of factor data. The calculation of point information based on a tensor set of vectors and matrices will be described in Equation 7 below.

$$\sum_{r=1}^{R}\{a_i(r)\circ a_{j,k}(r)\} + \{a_j(r)\circ a_{i,k}(r)\} + \{a_k(r)\circ a_{i,j}(r)\} \qquad \text{Equation 7}$$

In Equation 7, $a_i(r)$ denotes a factor value corresponding to an r-th tensor set in a factor $a_i$, $a_j(r)$ denotes a factor value corresponding to the r-th tensor set in a factor $a_j$, and $a_k(r)$ denotes a factor value corresponding to the r-th tensor set in a factor $a_k$. In Equation 7, $a_{j,k}(r)$ denotes a factor value corresponding to the r-th tensor set in a factor $a_{j,k}$ (e.g., a factor corresponding to coordinates (j,k) in the factor data 642), $a_{i,k}(r)$ denotes a factor value corresponding to the r-th tensor set in a factor $a_{i,k}$ (e.g., a factor corresponding to coordinates (i,k) in the factor data 652), and $a_{i,j}(r)$ denotes a factor value corresponding to the r-th tensor set in a factor $a_{i,j}$ (e.g., a factor corresponding to coordinates (i,j) in the factor data 662). In Equation 7, the sum of element-wise products of factor values belonging to the same tensor set may be calculated. The result calculated in Equation 7 may be a tensor value corresponding to coordinates (i, j, k) of the target space tensor 622, and may correspond to T(i, j, k).

Figure 7:
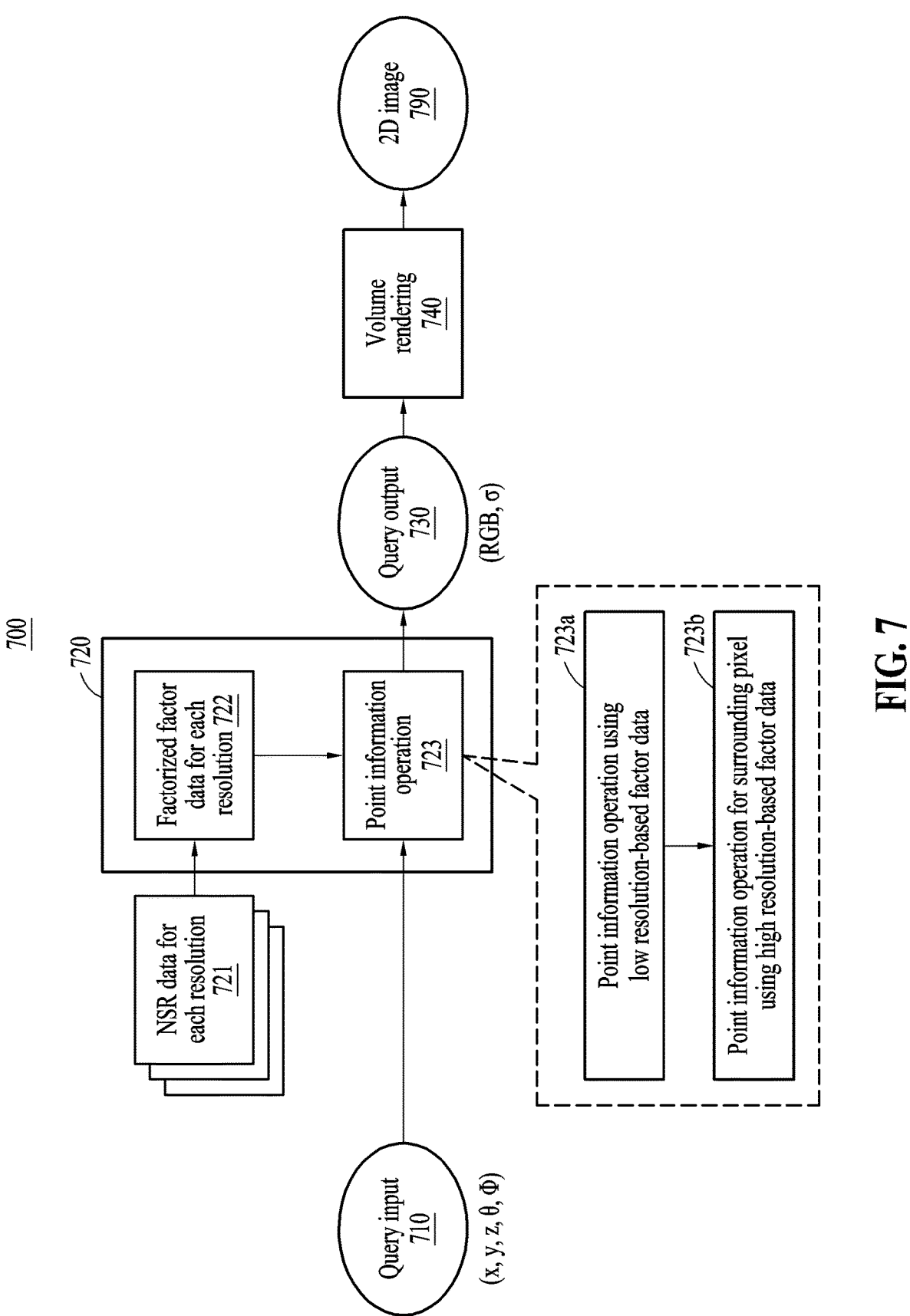
FIG. 7 illustrates an example of a shader operation using multi-resolution factor data according to one or more embodiments.

FIG. 7 illustrates an example of a shader operation using multi-resolution factor data according to one or more embodiments.

According to an example, an electronic device may store factorized factor data 722 for each resolution. FIG. 7 shows an example of storing multi-resolution factor data 722 and performing a point information operation 723 by an NSR model 720. For example, the electronic device may store factor data 722 based on a first resolution and factor data 722 based on a second resolution. The second resolution may be higher than the first resolution. The factor data 722 based on the second resolution may represent a 3D space having a denser grid than the factor data 722 based on the first resolution. The plurality of pieces of factor data 722 based on the second resolution may be built based on tensor sets obtained by factorizing a space tensor of a grid having the second resolution. The plurality of pieces of factor data 722 based on the first resolution may be built based on tensor sets obtained by factorizing a space tensor of a grid having the first resolution. An interval between voxels of the grid with the second resolution may be smaller than an interval between voxels of the grid with the first resolution. In other words, the grid with the second resolution may be denser than the grid with the first resolution. A low-resolution grid may have NSR values provided at less-frequent intervals. A high-resolution grid may have NSR values provided at more-frequent intervals.

The electronic device may factorize the factor data 722 respectively from NSR data 721 for each resolution. However, examples are not limited thereto. The grid based on the first resolution may be obtained by undersampling the grid based on the second resolution. Grids corresponding to the plurality of resolutions may be obtained from one grid representing a 3D space, and the factor data 722 for each resolution may be built.

According to an example, the electronic device may perform the point information operation 723 using the plurality of pieces of factor data 722 based on the plurality of resolutions. Pixel information may be determined using the plurality of pieces of factor data 722 based on the plurality of resolutions. For example, in operation 723*a*, the electronic device may perform a point information operation using low-resolution-based factor data. The electronic device may calculate first point information of first voxels corresponding to a grid with a first resolution (e.g., a low resolution) among points on a view direction in a 3D space, using the plurality of pieces of factor data 722 based on the first resolution. In operation 723*b*, the electronic device may perform a point information operation for a surrounding pixel using high-resolution-based factor data. The electronic device may calculate second point information of second voxels with a second resolution (e.g., a high resolution), higher than the first resolution, in the vicinity of the first voxels, using the plurality of pieces of factor data 722 based on the second resolution. The electronic device may calculate a query output 730 (e.g., first point information and second point information) based on multi-resolution factor data for a point corresponding to a query input 710 and surrounding points. The electronic device may determine pixel information based on the first point information and the second point information. The electronic device may perform volume rendering 740 based on the first point information and the second point information. The electronic device may perform an operation 700 of generating a 2D image 790 using a result of volume rendering 740. Therefore, the electronic device may more accurately and efficiently calculate the pixel value of each pixel along the view direction while requiring a relatively small amount of computation.

In an example, the electronic device may use factor data 722 of a different resolution for each pixel. For example, for a pixel of interest belonging to a region of interest (ROI) in a 2D scene, the electronic device may calculate point information (e.g., color information, volume density information, or an intermediate feature value) of points along the view direction using the plurality of pieces of factor data 722 based on the second resolution. For a pixel of a region other than the ROI, the electronic device may calculate point information using the plurality of pieces of factor data 722 based on the first resolution. Accordingly, the electronic device may reconstruct the pixel of the ROI using the high-resolution NSR data 721 and reconstruct the pixel of the other region using the low-resolution NSR data 721. The electronic device may intensively use resources to determine pixel values of the ROI.

Figure 8:
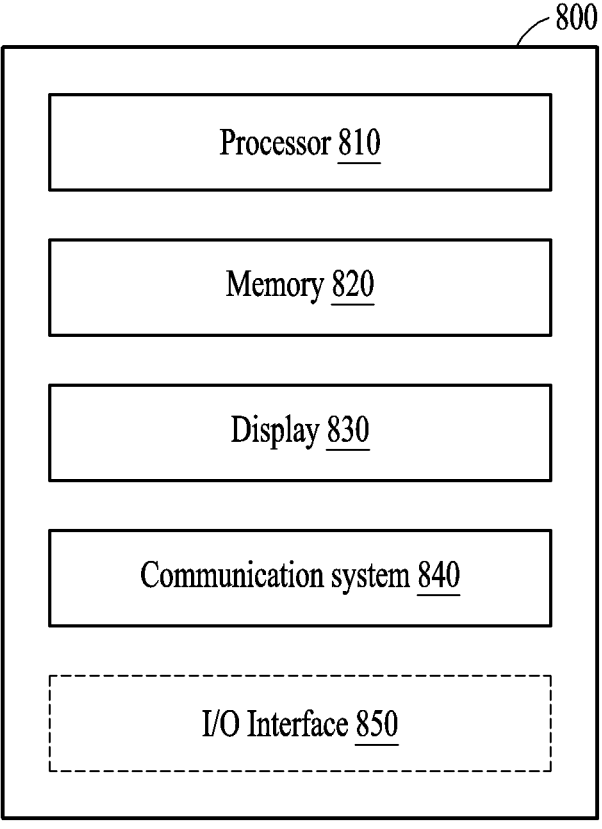
FIG. 8 illustrates an example of a configuration of an electronic device according to one or more embodiments.

FIG. 8 illustrates an example of a configuration of an electronic device according to one or more embodiments.

Referring to FIG. 8, an electronic device 800 may include a processor 810, a memory 820, a display 830, a communication system 840, and an input/output (I/O) interface 850, for example.

The processor 810 may obtain query inputs for points, in a 3D space, on a view direction from a viewpoint toward a pixel position of a 2D scene. The processor 810 may obtain, for each of the query inputs, point information using factors individually extracted from the plurality of pieces of factor data for a corresponding query input. The processor 810 may determine pixel information of the pixel position using the point information of the points on the view direction. However, the operation of the processor 810 is not limited thereto, and the processor 810 may perform at least a portion of the operations described with reference to FIGS. 1 to 7 in parallel or in time series. The operations described with reference to FIGS. 1 to 7 are not limited to being performed in the described order, and the order of some operations may be changed, or some operations may be added or omitted.

The processor 810 is representative of one or more of each of various types of processors, e.g., a CPU, GPU, NPU, etc.

The memory 820 may store a plurality of pieces of factor data built based on factorization of a tensor representing a 3D space. In addition, the memory 820 may further store any one or any combination of NSR data, an NSR data cube, and tensor sets factorized by a machine learning model (e.g., a neural network) configured to generate NSR data or an NSR data cube. The memory 820 may store data required to generate a 2D scene image from the 3D space.

The display 830 may output the generated 2D scene image. For example, based on a change in a view for the 3D space by a user input, the display 830 may display a 2D scene image corresponding to the new view. In response to a change in the view for the 3D space, the processor 810 described above may perform point information operations corresponding to view directions in the new view for each pixel, in real time, and in parallel. The display 830 may output a 2D scene image rendered in real time by the processor 810 for the new view.

In a non-limiting example, the electronic device 800 may render a 2D scene image for a game application, an e-commerce application, an augmented reality (AR) application, or a virtual reality (VR) application, and visualize the rendered 2D scene image through the display 830. The processor 810 may also, or alternatively, output the 2D scene image, for example, using the I/O interface 850, which may be wiredly connected to an exterior display, for example, for display of the 2D image, or other rendered images, by the exterior display. Additionally, or alternatively, a transceiver represented by the communications system 840 may transmit wirelessly and/or by a wired connection the 2D image to another electronic device, e.g., having a display for the display of the 2D image therein.

For example, the electronic device 800 may efficiently generate a high-quality 2D scene image suitable for a 3D virtual environment configured in a game. The electronic device 800 may render, and provide in real time, a 2D scene image corresponding to a view to be provided to the display 830 of the electronic device 800 (e.g., a mobile terminal) of a user, in the virtual environment in the game. Similarly, the electronic device 800 may extract a 3D space of an environment surrounding the user and promptly visualize a 2D scene image according to a viewpoint of the user, in a VR environment or an AR environment. Accordingly, the electronic device 800 may provide a realistic virtual space in real time.

As another example, the electronic device 800 may render in real time a 2D scene image corresponding to a view of a buyer toward a product in the electronic device 800 (e.g., a mobile terminal) of the buyer and output the rendered 2D image through the display 830, in e-commerce. Accordingly, the electronic device 800 may visually provide the exhibited product so that the realistic appearance of the product may be viewed from any desired direction.

The communication system 840 may include a communication circuit configured to establish communication with an external device. The communication system 840 may receive pre-built factor data from the external device (e.g., a server or another electronic device). The communication system 840 may receive any one or any combination of NSR data, an NSR data cube, and a machine learning model (e.g., a neural network) configured to generate NSR data from the external device.

According to an example, the electronic device 800 may generate a high-quality 2D scene image including a realistic ray tracing effect. The electronic device 800 may efficiently reconstruct a 2D scene image for a 3D space through reduced graphics computing. Using factor data lightened from NSR data based on factorization as described above may improve data efficiency. In addition, as the inference speed increases due to the reduction in the size of data, the query speed may also improve. The aforementioned electronic device 800 may also be a mobile terminal. The image generating method described above with reference to FIGS. 1 to 7 may be performed a require relatively small amount of computing power from the processor 810 and a small amount of the memory 820.

According to an example, the electronic device 800 may use a general-purpose NSR algorithm (e.g., NeRF or Multiplane Images (MPI)) to generate NSR data. The electronic device 800 may use scalable factor data for 3D scene information. For example, when a tensor representing a 3D space is in the form of a 500×500×500 grid, the size of NSR data for all voxels in the 3D space may be 125,000,000 (=500×500×500). When the one-axis dimension p of a target space tensor is 100, the electronic device 800 may reduce the size of factor data to 150,000 (=100×(500+500+500)), which is 1/830, by CP factorization. In a non-limiting example, block term decomposition (BTD) may be employed to reduce the data to ⅕. Therefore, the data size may be reduced, which may be advantageous when in an example in which the electronic device 800 is a mobile terminal. In addition, pixel-wise parallel operations through shader acceleration may exhibit an improved speed of 640,000 times in generating a 2D scene image of a resolution of 800×800, for example. Since shader acceleration is a general-purpose operation, the above-described pixel parallelization operations may be performed without requiring a specialization for individual GPU devices employed to perform these operations.

According to one example, factorization of an NSR data cube may be performed on a PC or workstation with excellent computing power. The electronic device 800 (e.g., a mobile terminal) may perform runtime rendering. The electronic device 800 may calculate color values and volume density values of points that a view direction for each pixel passes through in a 2D scene image to be reconstructed for a 3D space.

The electronic devices, processors, memories, electronic device 800, processor 810, memory 820, display device 830, communication system 840, and I/O interface 850 described herein with respect to FIGS. 1-8 are implemented by and representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and/or any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. An electronic device, comprising:
a processor configured to:
generate, for each of a plurality of query inputs, point information using factors individually extracted from a plurality of pieces of factor data for a corresponding query input; and
generate pixel information of a pixel position using the point information of points,
wherein the plurality of query inputs represent the points, in a three-dimensional (3D) space, along a view direction from a viewpoint toward a pixel position of a two-dimensional (2D) scene, and
wherein the plurality of pieces of factor data is generated based on factorization of a target space tensor derived from a 3D grid representing the 3D space and comprises a first plurality of pieces of factor data related to color and a second plurality of pieces of factor data related to volume density.

2. The device of claim 1, wherein the processor is further configured to determine coordinates for the plurality of query inputs, each of the coordinates representing a corresponding point in the 3D space and direction information representing the view direction.

3. The device of claim 1, wherein, for the generation of the point information, the processor is configured to generate the point information using a vector outer product of the factors individually extracted from the plurality of pieces of factor data.

4. The device of claim 1, wherein, for the generation of the point information, the processor is configured to:
generate, for each query input, color information of a point corresponding to a corresponding query input based on the first plurality of pieces of factor data, and
generate, for each query input, volume density information of a point corresponding to a corresponding query input based on the second plurality of pieces of factor data.

5. The device of claim 1, wherein, for the generation of the point information, the processor is configured to:
determine surrounding query inputs corresponding to voxels in a vicinity of a requested voxel among voxels in the 3D space based on an absence of the requested voxel in a piece of the factor data of the plurality of pieces of factor data, and
calculate point information corresponding to the requested voxel using pieces of surrounding point information obtained based on the surrounding query inputs.

6. The device of claim 1, wherein the processor is configured to, for the generation of the pixel information, determine a color value of the pixel position to be the pixel information of the pixel position using the point information of the points, and
wherein the processor is further configured to generate an image corresponding to the 2D scene by repeating the determining of the color value for pixel positions included in the 2D scene.

7. The device of claim 1, wherein, for the generation of the pixel information, the processor is configured to:
obtain color and volume density curves of points according to the view direction, and
determine the pixel information based on the obtained color and volume density curves.

8. The device of claim 1, wherein the processor is configured to generate the pixel information using the plurality of pieces of factor data according to a resolution of a plurality of resolutions.

9. The device of claim 1, wherein, for the generation of the point information, the processor is configured to:
generate first point information of first voxels corresponding to a first grid with a first resolution among points along the view direction in the 3D space, using a plurality of pieces of factor data based on the first resolution; and
generate second point information of second voxels corresponding to a second grid with a second resolution, higher than the first resolution, in a vicinity of the first voxels, using a plurality of pieces of factor data based on the second resolution, and wherein, for the generating of the pixel information, the processor is configured to determine the pixel information based on the first point information and the second point information.

10. The device of claim 1, wherein the processor is configured to:

generate a target space tensor representing the 3D space, factorize the target space tensor into a plurality of tensor sets, and build the plurality of tensor sets as the plurality of pieces of factor data.

11. The device of claim 10, wherein, for the generating of the target space tensor, the processor is configured to compress the 3D space by extracting a portion of voxels in the 3D space.

12. The device of claim 10, wherein, for the generating of the target space tensor, the processor is configured to select a voxel having a volume density exceeding a threshold from among voxels in the 3D space.

13. The device of claim 10, wherein the processor is configured to build each tensor set by factorizing the target space tensor into tensors of a dimension lower than a dimension of the target space tensor.

14. The device of claim 10, wherein each of the plurality of tensor sets is a set of three vectors.

15. The device of claim 10, wherein each of the plurality of tensor sets is a set of vectors and matrices.

16. The device of claim 10, further comprising a memory, wherein the processor is configured to:

generate the plurality of pieces of factor data corresponding to each basis tensor of a plurality of basis tensors by merging the plurality of tensor sets based on the plurality of basis tensors; and store the plurality of pieces of factor data in the memory, and wherein, for the generating of the point information, the processor is further configured to load the plurality of pieces of factor data.

17. The device of claim 10, wherein the generating of the target space tensor is based on an extraction of voxels corresponding to the 3D space from a pre-built neural scene representation (NSR) data cube or an NSR data cube built using a neural network.

18. The device of claim 1, wherein the processor is configured to perform the generating of the point information based on the plurality of pieces of factor data and the generating of the pixel information, in parallel with one or more additional respective generations of point information and pixel information for other pixels of an image of the 2D scene.

19. The device of claim 1, further comprising a memory storing instructions, which, when executed by the processor, configures the processor to perform the generating of the point information and the generating of the pixel information.

20. A processor-implemented method, comprising:

generating, for each of a plurality of query inputs, point information using factor values individually extracted from a plurality of pieces of factor data for a corresponding query input; and generating pixel information of a pixel position using the point information of points, wherein the plurality of query inputs are of the points, in a three-dimensional (3D) space, along a view direction from a viewpoint toward a pixel position of a two-dimensional (2D) scene image, and wherein the plurality of pieces of factor data is generated based on factorization of a target space tensor derived from a 3D grid representing the 3D space and comprises a first plurality of pieces of factor data related to color and a second plurality of pieces of factor data related to volume density.

21. A mobile terminal, comprising:

an input/output interface configured to obtain a plurality of query inputs for a plurality of points, in a three-dimensional (3D) space according to a viewpoint from a view direction for a two-dimensional (2D) scene; and a processor configured to:

generate, for each of a plurality of query inputs, point information using factors individually extracted from a plurality of pieces of factor data for a corresponding query input; and generate, for each of the plurality of query inputs, pixel information related to the factor data to generate; and generate an image corresponding to the 2D scene, and wherein the plurality of pieces of factor data is generated based on factorization of a target space tensor derived from a 3D grid representing the 3D space and comprises a first plurality of pieces of factor data related to color and a second plurality of pieces of factor data related to volume density.

* * * * *